Figures 1, 2:
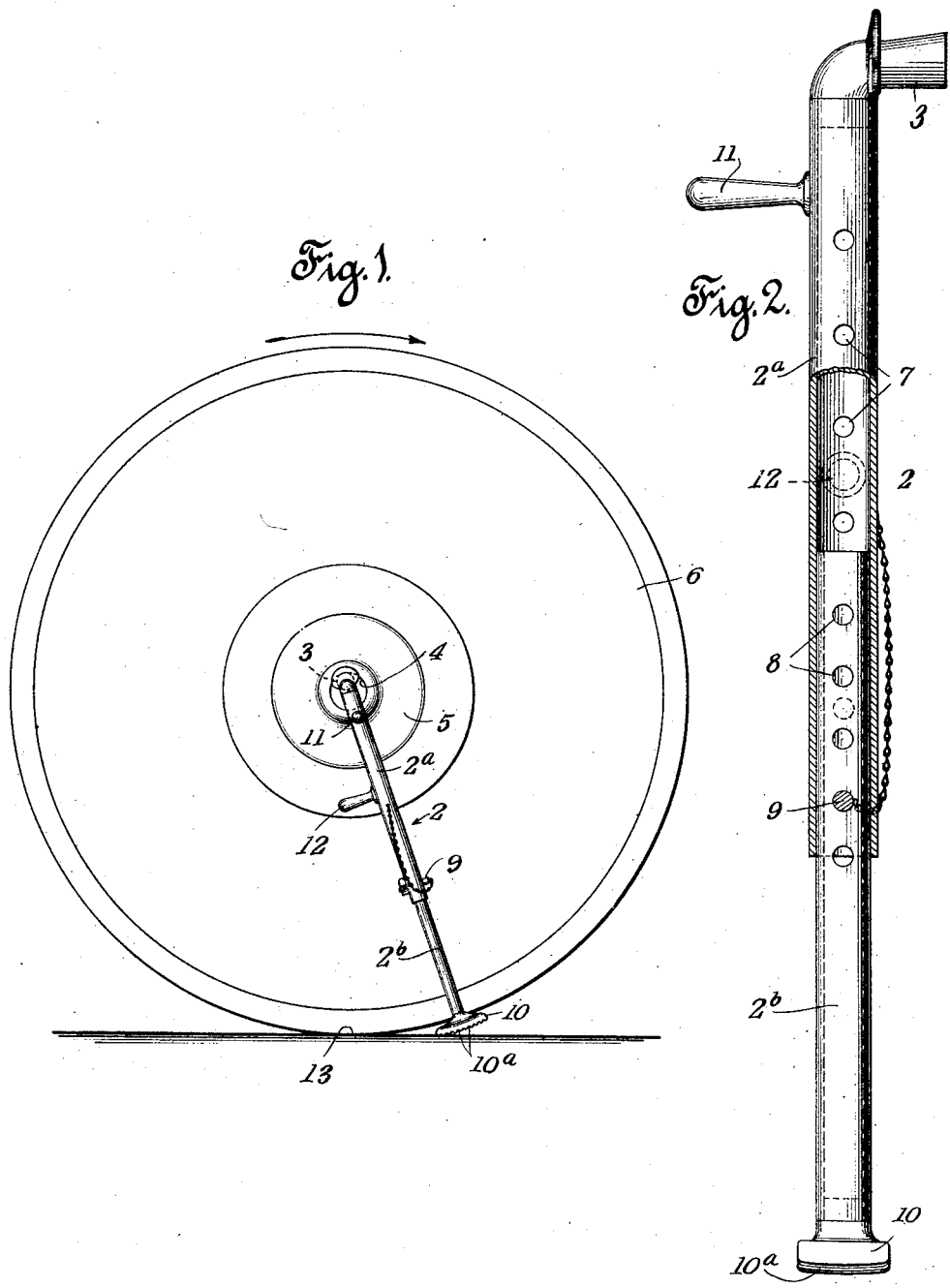

June 2, 1931. D. R. STEVENS 1,807,802
REEL CRUTCH
Filed Dec. 17, 1927

INVENTOR.
Donald R. Stevens
BY Wilbur M. Stone
ATTORNEY

Patented June 2, 1931

1,807,802

UNITED STATES PATENT OFFICE

DONALD R. STEVENS, OF RIDGEWOOD, NEW JERSEY, ASSIGNOR TO THE WATSON MACHINE COMPANY, OF PATERSON, NEW JERSEY, A CORPORATION OF NEW JERSEY

REEL CRUTCH

Application filed December 17, 1927. Serial No. 240,681.

This invention relates to reel crutches and has for its object to provide a device of the character specified, simple in construction and efficient in operation.

My improved device is particularly applicable for moving heavy cylindrical bodies such as reels of wire rope or electrical cables commonly having an axial passage therethrough.

My improvements comprise features illustrated in their preferred form in the drawings accompanying this specification, wherein Figure 1 is a front elevation of my improved crutch in operative engagement with a reel. Fig. 2 is a side elevation, partly in section, of the crutch. The scale of Fig. 2 is about three times that of Fig. 1.

My improved crutch comprises an upright member designated in a general way by 2 and which is provided with an arm 3 projecting laterally from its upper end. Said arm is adapted for entering one end as 4 of the hollow hub 5 of reel 6.

While upright member 2 may be in some cases without means for lengthwise adjustment, it preferably comprises an upper section 2a and a lower section 2b, relatively adjustable for changing the length of the device to accommodate different diameters of reels.

As illustrated, said sections are of tubular construction, the lower section being telescopically slidable within the upper section. For securing said sections in adjusted relation a plurality of holes as 7, 7 are provided through one of opposite walls of section 2a and similar holes 8, 8 are provided in lower section 2b. A hole in section 2b is then brought into correspondence with a hole in section 2a and pin 9 thrust through both holes, thereby locking the two sections together.

Lower section 2b is preferably provided with shoe 10 having a curved tread, said curve lying in a circle whose center is approximately the center of arm 3. Said shoe may have a corrugated tread 10a to prevent slipping when in use.

For convenience handle 11 is provided, projecting from the upper portion of section 2a preferably in a direction opposite to the direction of arm 3 and a second handle 12 may be provided, projecting at an angle to handle 11 and lower down on said section 2a.

In use upright member 2 is adjusted to a length from the upper edge of arm 3 to the tread of shoe 10 slightly greater than the radius of the reel to which it is to be applied. Then arm 3 is thrust into the bore 4 of the reel hub, and the shoe brought into contact with the floor or ground, when, by a relatively slight pressure on the reel in the direction of the arrow thereover, said reel is rolled onto the supporting crutch, the adjacent lower edge 13 of the reel being lifted from the floor and the reel easily shifted to a new position.

By the use of this device loaded reels weighing more than five tons may be readily handled by one man.

I claim:

1. A reel crutch including in combination an upright member having at its upper end an arm projecting laterally therefrom, said arm being adapted for entering one end of the hollow hub of a reel, said upright member comprising an upper and lower section telescopically slidable relatively to each other, means for securing said sections in adjusted position, a handle projecting from the upper portion of the device in a direction opposite to the direction of the projecting arm and a second handle projecting from said device at an angle to said first mentioned handle.

2. A reel crutch including in combination an upright member having at its upper end an arm projecting laterally therefrom, said arm being adapted for entering one end of the hollow hub of a reel, a handle projecting from the upper portion of the device in a direction opposite to the direction of the projecting arm and a second handle projecting from said device at an angle to said first mentioned handle.

In witness whereof, I hereby affix my signature this 13th day of December, 1927.

DONALD R. STEVENS.